G. N. Cummings,

Knob Attachment.

No. 1,645. Reissued Mar. 29, 1864.

Witnesses:
J. W. Coombs
G. W. Reed

Inventor:
G. N. Cummings
per Munn & Co
Attorneys

AM. PHOTO-LITHO. CO. N.Y. (OSBORNE'S PROCESS.)

UNITED STATES PATENT OFFICE.

JOHN E. PARKER AND HENRY J. P. WHIPPLE, OF WEST MERIDEN, ASSIGNEES OF G. N. CUMMINGS, OF MERIDEN, CONNECTICUT.

IMPROVEMENT IN MODE OF ATTACHING KNOBS TO SPINDLES.

Specification forming part of Letters Patent No. 35,924, dated July 22, 1862; Reissue No. 1,645, dated March 29, 1864.

*To all whom it may concern:*

Be it known that G. N. CUMMINGS, of Meriden, New Haven county, Connecticut, has invented a certain new and useful Improvement in the Mode of Attaching Door-Knobs to their Spindles; and we, JOHN E. PARKER and H. J. P. WHIPPLE, both of West Meriden, in said county, being now the sole owners of said invention, do hereby declare that the following is a full, clear, and exact description thereof, reference being made to the annexed drawings, forming a part of this specification, in which—

Figure 2:
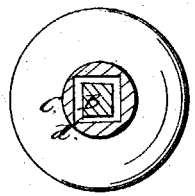
Figure 1:
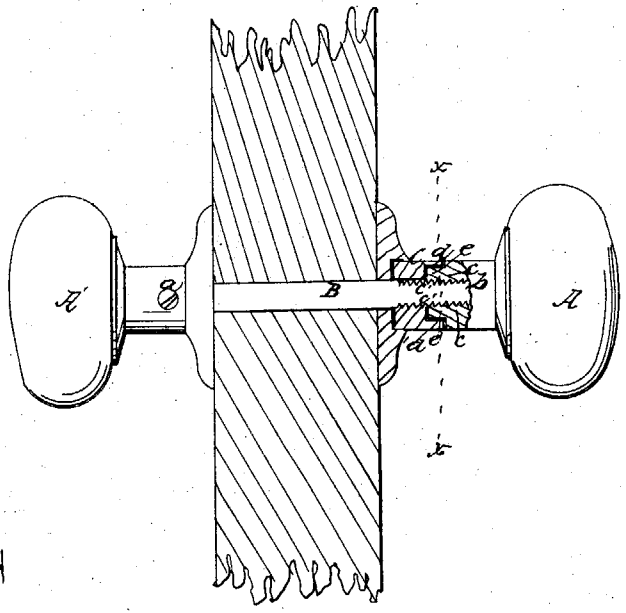

Figure 1 is a side elevation, partly in section. Fig. 2 is a transverse section on the line *x x* of Fig. 1.

Similar letters indicate similar parts in both the figures.

This invention has reference to that class of knobs and spindles in which the spindle is made square with a screw-thread cut on the corners and a corresponding thread in a round hole in the shank of the knob, so that the knob can be adjusted to any desired position on the spindle, whereby the length of the spindle may be varied to suit the various thicknesses of doors. The thread on the spindle and in the knob keeps the knob from coming off, but to enable the knob to turn the spindle some positive fastening or clutch of the one to the other is required. A screw set in the shank of the knob and having its point extending into a groove in the flat side of the spindle will effect the turning of the spindle, but this screw is apt to work out, inasmuch as the thread is on the part which passes through the shank of the knob.

The invention of said CUMMINGS effects the combination of the knob with the threaded spindle by means of an independent piece of metal which embraces the spindle upon its square part, and also engages with the end of the shank of the knob, so arranged and operating that it shall, when the knob is in place on the door, serve the double purpose of imparting the partial rotation of the knob to the spindle and of preventing the knob from being unscrewed off the spindle. The surface of this piece may readily be made flush with the shank of the knob and forming apparently a portion of the same. A variety of constructions may be resorted to in carrying this out, but that which has been preferred is as follows: The two knobs A A′ are connected by a spindle, B, in the usual manner. This is square, and the knob A′ is provided with a socket corresponding to the spindle, and is secured to one end of the same by means of a screw, *a*, which passes through the shank of said knob into the spindle, thus preventing that knob from slipping along the spindle. The knob A has a round hole drilled through its longitudinal center, extending from the inner end of its shank *b* nearly through its entire length, and a screw-thread, *c*, is cut into this hole to correspond to a screw-thread, *c′*, cut on the corners of the end of the spindle B. By these means the distance between the two knobs A A′ can be increased or diminished simply by turning the knob A in one direction or the other, and the length of the spindle can be adjusted with perfect exactness to doors of different thickness.

At C is a sleeve made of brass or other suitable material, and perforated by a square hole, so that it slips easily on the spindle B. That end of said sleeve which faces the knob A is provided with a square socket, *d*, and a corresponding projection, *e*, is made on the inner end of the shank *b*, so that by turning the knob to the proper position the sleeve can be pushed over the end of the shank, as clearly shown in Fig. 1 of the drawings. It is obvious that if the socket in the sleeve is thus made to catch over the square projection on the shank the knob A is prevented from turning, and it cannot be turned until the sleeve is removed from combination with the knob.

In order to adjust the length of the spindle B, it is only necessary to take off the knob A′ from the spindle and to push the spindle through the door. If then the length of the spindle is to be increased or diminished, the required length can be attained by turning the knob A in the proper direction. The sleeve is now to be brought into combination with the knob A, thereby preventing that from turning on the spindle. The spindle is then pushed through the door, and the knob A′ fastened by the screw *a*, as shown in Fig. 1.

We claim as the invention of said G. N. CUMMINGS—

Combining the knob with a threaded spindle by means of an independent piece of metal which embraces the spindle at its square portion and engages with the end of the shank of the knob, substantially in the manner and for the purposes set forth herein.

JOHN E. PARKER.
H. J. P. WHIPPLE.

Witnesses:
EDMUND A. PARKER,
EDMUND PARKER.